United States Patent
Song et al.

(10) Patent No.: US 7,362,940 B2
(45) Date of Patent: Apr. 22, 2008

(54) OPTICAL-FIBER COATING APPARATUS

(75) Inventors: Minsuk Song, Tokyo (JP); Kazuhisa Kashihara, Tokyo (JP); Toshiaki Tateishi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 19 days.

(21) Appl. No.: 11/693,230

(22) Filed: Mar. 29, 2007

(65) Prior Publication Data
US 2007/0227194 A1    Oct. 4, 2007

(30) Foreign Application Priority Data
Mar. 30, 2006    (JP)    ............ 2006-092866

(51) Int. Cl.
  *G02B 6/02*    (2006.01)
  *B05C 11/02*   (2006.01)
  *B05D 5/06*    (2006.01)
(52) U.S. Cl. .................... 385/128; 118/125; 427/163.2
(58) Field of Classification Search .................... None
See application file for complete search history.

(56) References Cited

U.S. PATENT DOCUMENTS

2006/0016393 A1 *   1/2006   Fujimaki et al. ............ 118/420

FOREIGN PATENT DOCUMENTS

JP              8-239246          9/1996

* cited by examiner

*Primary Examiner*—Michelle Connelly-Cushwa
*Assistant Examiner*—Chris Chu
(74) *Attorney, Agent, or Firm*—Oblon, Spivak, McClelland, Maier & Neustadt, P.C.

(57) ABSTRACT

A guide hole guides a primary-coated optical fiber to a tubular inlet hole. An inner diameter of the guide hole is larger than that of the tubular inlet hole. An inner diameter of the tubular inlet hole is in a range from 1.5 times to 2.0 times that of the primary-coated optical fiber. A length of the tubular inlet hole is in a range from 1.0 mm to 2.0 mm. A depth of the guide hole is in a range from 2.0 mm 9.0 mm. A relation $B \leq A$ is satisfied, with B equal to or larger than 7.0 mm, where A is an inner diameter of a leading edge of the guide hole continued to a trailing edge of the tubular inlet hole, and B is an inner diameter of a trailing edge of the guide hole.

1 Claim, 3 Drawing Sheets

OPTICAL-FIBER COATING APPARATUS

BACKGROUND OF THE INVENTION

1. Field of the Invention

The present invention relates to an optical-fiber coating apparatus used in a coating process for forming a primary coating and a secondary coating on a glass optical fiber, and more particularly, to an improvement of a secondary coating device that forms the secondary coating on the primary coating.

2. Description of the Related Art

Typically, a surface of a glass optical fiber made of silica glass is coated with a primary coating having a relatively low Young's modulus. Subsequently, a secondary coating having a relatively high Young's modulus compared to that of the primary coating is formed on the primary coating. As for a resin for the primary coating and the secondary coating, an ultraviolet (UV)-curing resin or a heat-curing resin is generally used.

FIG. 3 is a schematic diagram for explaining a common drawing process for forming the primary coating and the secondary coating on a surface of the glass optical fiber.

As shown in FIG. 3, an optical fiber preform 41 is fed into a heating furnace (drawing furnace) 42 at a predetermined speed from a leading end. The optical fiber preform 41 is heated and melted, and drawn into a glass optical fiber glass optical fiber 16 having a constant outer diameter in a longitudinal direction, for example, an outer diameter of 125 micrometers.

A UV-curing resin is coated on a surface of the glass optical fiber 16 with a predetermined coating thickness by a primary coating device 43. A UV light is irradiated on the coated resin in a UV irradiating chamber 44 to cure the coated resin, forming the primary coating.

After that, a UV-curing resin is coated on a surface of the primary coating with a predetermined coating thickness by a secondary coating device 45. A UV light is irradiated on the coated resin in a UV irradiating chamber 46 to cure the coated resin, forming the secondary coating.

The optical fiber on which the secondary coating is formed is introduced by a pulling capstan or a predetermined number of guide rolls provided as appropriate, and wound around a bobbin 47 that is mounted on a winding device at a predetermined winding speed.

If a heat-curing resin is used as the resin for the primary coating and the secondary coating, heating furnaces are provided instead of the UV irradiating chamber 44 and the UV irradiating chamber 46.

In these latter days, it is considered that a series of the drawing process shown in FIG. 3 should be speeded up and a length of the optical fiber to be drawn at one time should be extended, from a viewpoint of improving a productivity of the optical fiber to reduce a manufacturing cost.

However, in the secondary coating device 45 shown in FIG. 3, when a primary-coated optical fiber 17 is introduced into a resin reservoir provided in the secondary coating device 45, a foreign substance adheres to an inner wall or a surrounding portion of an inlet hole that is formed on a nipple that introduces the primary-coated optical fiber 17 to a direction of dies, and the foreign substance grows as time goes on.

When the foreign substance adheres to the inner wall of the surrounding portion of the inlet hole of the nipple, and when it grows, an inner diameter of the inlet hole diminishes. Then, the primary-coated optical fiber 17 that is passing through the inlet hole becomes damaged, and as a result, it will not be possible to continue to manufacture a high-quality optical fiber.

In fact, the foreign substance is caused from the resin composition for the primary coating that is coated on the surface of the glass optical fiber. When the resin composition for the primary coating is cured a heat is produced by the heat of polymerization. Some compositions of the resin that are not polymerized because of a relatively low molecular weight become volatile by the heat, reach the inlet hole of the nipple following the primary-coated optical fiber 17. The compositions of the resin reached the inlet hole are concentrated and adhere to the inner wall or the surrounding portion of the inlet hole.

The adherence of the foreign substance to the inner wall or the surrounding portion of the inlet hole becomes more critical as the drawing speed becomes fast and the length of the optical fiber to be drawn at one time becomes long.

To cope with the problem, a conventional technology has tried to prevent an adherence of the foreign substance by providing a tapered inlet hole of which the diameter is increased in a direction of forwarding the primary-coated optical fiber 17 at a leading edge of the inlet hole, i.e., a leading edge of the nipple, for the primary-coated optical fiber 17 in the secondary coating device 45, and blowing off the volatiles coming on a surface of the primary coating (see, for example, Japanese Patent Application Laid-Open No. H08-239246).

However, when an experiment is performed by providing a tapered inlet hole of which the diameter is increased in the direction of forwarding the primary-coated optical fiber at the leading edge of the nipple, as the secondary coating device disclosed in Japanese Patent Application Laid-Open No. H08-239246, it is found that the volatiles coming on the surface of the primary coating cannot be blown off as expected.

As a result, because an occurrence of a damage on the surface of the primary coating caused by the foreign substance cannot be prevented for sure, a speed of manufacturing the optical fiber cannot be increased. In addition, because the coating process cannot be continued for a long time, it is not possible to extend the length of the optical fiber, either.

SUMMARY OF THE INVENTION

It is an object of the present invention to at least partially solve the problems in the conventional technology.

An optical-fiber coating apparatus according to one aspect of the present invention includes a primary coating device that forms a primary coating on a surface of a glass optical fiber; and a secondary coating device that forms a secondary coating on a surface of a primary-coated optical fiber on which the primary coating is formed. The secondary coating device includes a tubular inlet hole that introduces the primary-coated optical fiber into a resin reservoir provided in the secondary coating device, a guide hole that guides the primary-coated optical fiber to the tubular inlet hole, the guide hole being continued to a trailing edge of the tubular inlet hole and being provided coaxially with the tubular inlet hole. An inner diameter of the guide hole is larger than an inner diameter of the tubular inlet hole. An inner diameter of the tubular inlet hole is equal to or larger than 1.5 times an outer diameter of the primary-coated optical fiber and equal to or smaller than 2.0 times the outer diameter of the primary-coated optical fiber. A length of the tubular inlet hole is equal to or larger than 1.0 millimeter and equal to or smaller than 2.0 millimeters. A depth of the guide hole is equal to or larger than 2.0 millimeters and equal to or smaller than 9.0 millimeters. A relation B≦A is satisfied with B equal to or larger than 7.0 millimeters, where A is an inner diameter of a leading edge of the guide hole that is continued to the trailing edge of the tubular inlet hole, and B is an inner diameter of a trailing edge of the guide hole.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
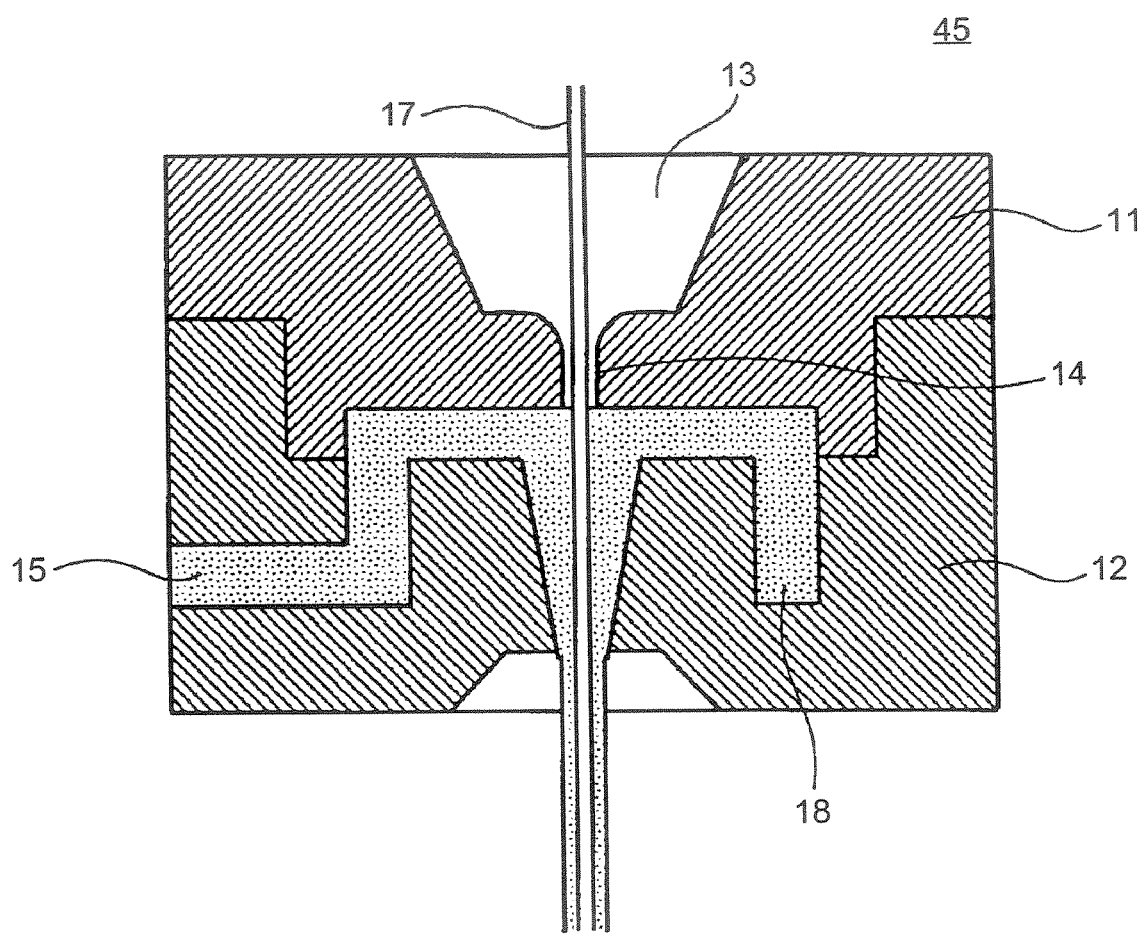
FIG. 1 is a vertical cross section of a secondary coating device for an optical fiber, according to an embodiment of the present invention.
Figure 2:
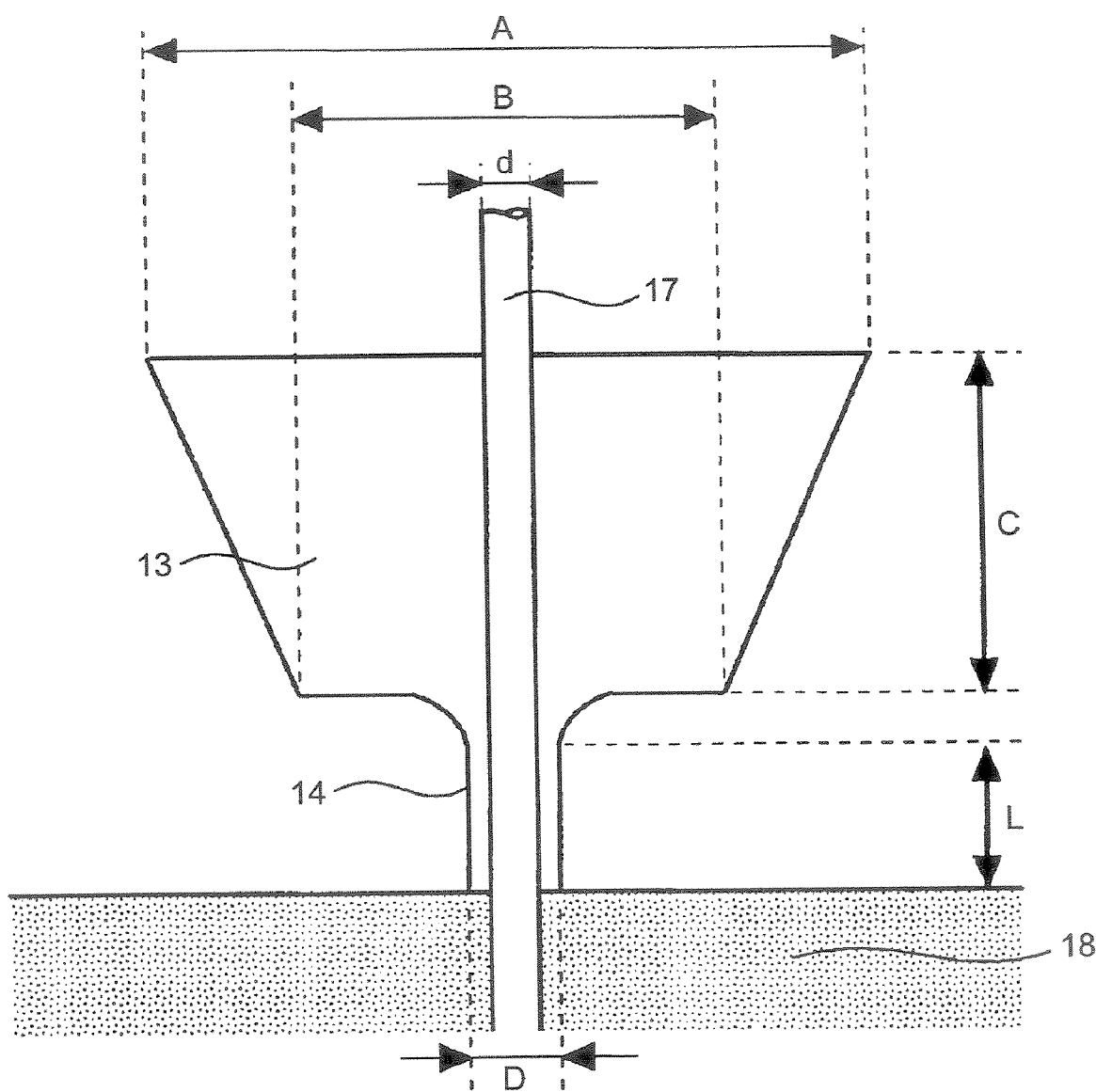
FIG. 2 is an enlarged view of a substantial part of the secondary coating device for an optical fiber shown in FIG. 1.

FIG. 1 is a vertical cross section of a secondary coating device 45 for an optical fiber, according to an embodiment of the present invention. FIG. 2 is an enlarged view of a substantial part of the secondary coating device 45 shown in FIG. 1.

As shown in FIGS. 1 and 2, the secondary coating device 45 is configured with a nipple 11 that introduces a primary-coated optical fiber 17 into the secondary coating device 45 and a die 12 that coats a resin on the primary-coated optical fiber 17 that is guided by the nipple 11 and moved downward from the upper side to the lower side in FIGS. 1 and 2.

In the nipple 11, a primary-coated optical fiber guide hole 13 (hereinafter "guide hole 13") is formed at a portion where the primary-coated optical fiber 17 is introduced into the secondary coating device 45, and a tubular inlet hole 14 is formed at a leading edge of the guide hole 13. The leading edge of the nipple 11 is a side of the nipple 11 in a direction of movement of the primary-coated optical fiber 17, i.e., the lower side of the nipple 11 in FIGS. 1 and 2.

As described above, in the nipple 11, the tubular inlet hole 14 is provided at the leading edge of the nipple 11, for introducing the primary-coated optical fiber 17 into a resin for secondary coating that is supplied in a resin reservoir 18 inside the secondary coating device 45. In addition, at a trailing edge of the tubular inlet hole 14, the guide hole 13 is provided coaxially with the tubular inlet hole 14 via an R-cut connecting portion or the like if necessary. The guide hole 13 is continued to the tubular inlet hole 14. An inner diameter of the guide hole 13 is larger than that of the tubular inlet hole 14.

A desired resin, for example, a UV-curing resin is filled in the resin reservoir 18, which is formed with the nipple 11 and the die 12, from a resin supplying port 15. The resin is coated on a surface of the primary-coated optical fiber 17 that moves through the secondary coating device 45 from the upper side to the lower side.

All parts except for a substantial part of the resin reservoir 18, i.e., a path of supplying the resin including the resin supplying port 15 formed in the die 12, are in a rotational symmetric shape that takes an axis of the primary-coated optical fiber 17 moving through the secondary coating device 45 as an axis of symmetry.

A main feature of the optical-fiber coating apparatus according to the present invention, i.e., the secondary coating device 45, is in the nipple 11. As shown in FIG. 2, the guide hole 13 of the nipple 11 is tapered in such a manner that the inner diameter is decreased toward the tubular inlet hole 14 that is coaxially formed with the guide hole 13. In other words, a vertical cross section of the guide hole 13 shows an inverted trapezoid shape. When the inner diameter of the leading edge of the guide hole 13 is B and the inner diameter of the trailing edge of the guide hole 13 is A, a relation B≦A is satisfied, with a depth C.

The tubular inlet hole 14 is provided coaxially with the guide hole 13 via an R-cut connecting portion or the like, which is continued to the guide hole 13.

The tubular inlet hole 14 has an inner diameter D that is smaller than the inner diameter B of the guide hole 13, with a length L. As a matter of course, the inner diameter D of the tubular inlet hole 14 is set to be larger than an outer diameter d of the primary-coated optical fiber 17 that moves through the tubular inlet hole 14.

The term "tubular" means that the inner diameter is constant in a longitudinal direction, so that a portion where the inner diameter is not constant in the longitudinal direction, such as the R-cut connecting portion, is not included in the length L of the tubular inlet hole 14.

Several kinds of samples were prepared by changing the values of A, B, C, D, and L in the nipple 11. Then, a series of experiments was performed to find out appropriate values of A, B, C, D, and L that can reduce the adherence of the foreign substance to the inner wall or the surrounding portion of the tubular inlet hole 14, as follows.

Figure 3:
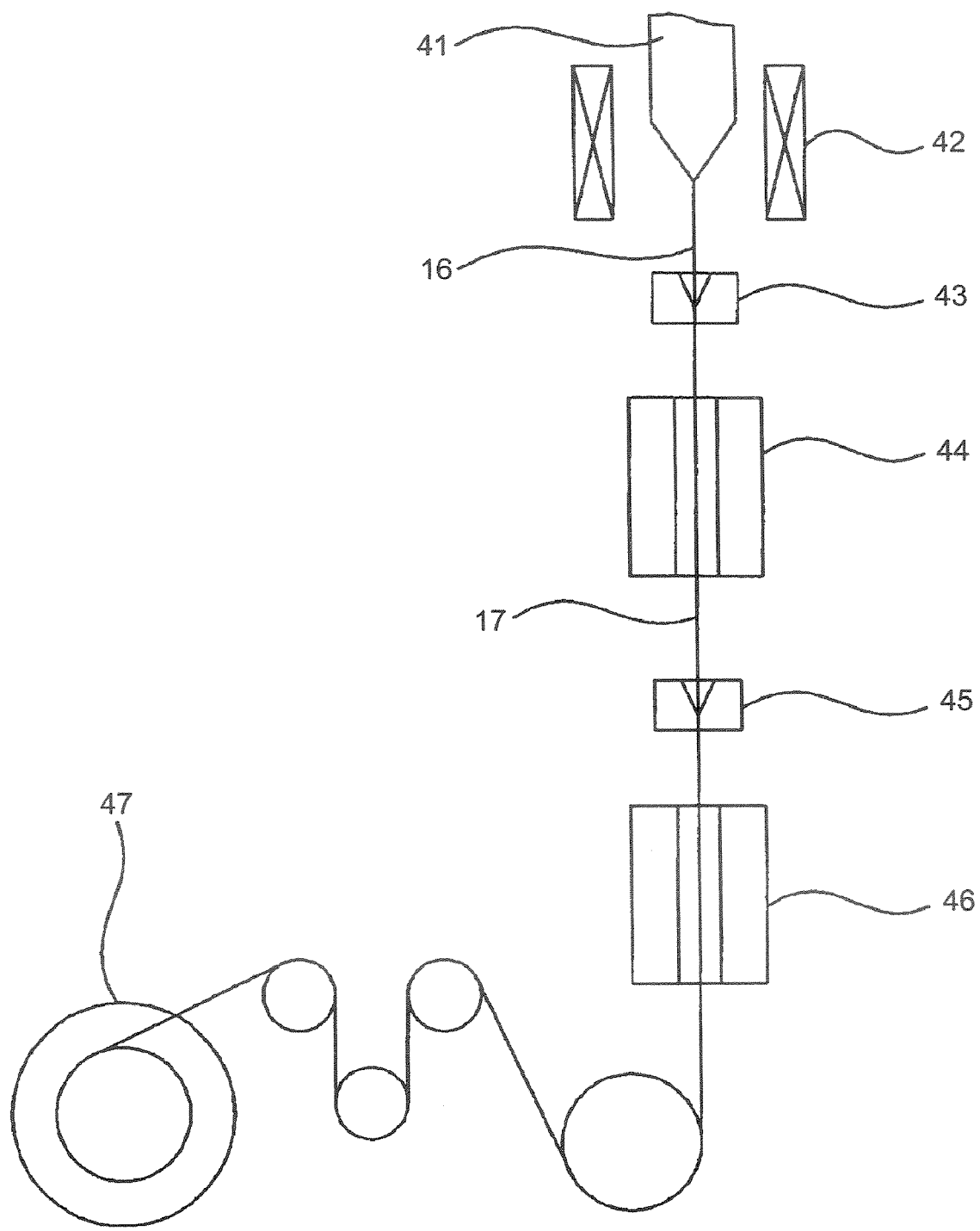
FIG. 3 is a schematic diagram for explaining a common apparatus for manufacturing an optical fiber.

The secondary coating device 45 shown in FIGS. 1 and 2 was used for the experiments, and the devices same as those shown in FIG. 3 were used for other parts of the drawing apparatus.

The speed of drawing the optical fiber was set to 1,000 m/min. A single time of drawing was set to be completed when the optical fiber of 300 kilometers was drawn from a single optical-fiber preform 41.

The process of manufacturing the optical fiber was stopped when the foreign substance caused by the gas occurred from the primary coating adhered to the inner wall or the surrounding portion of the tubular inlet hole 14, and the inner diameter of the tubular inlet hole 14 diminishes due to a growth of the foreign substance, so that a normal drawing and coating could not be performed. The optical fiber obtained when the drawing process was completed with 300 kilometers of the optical fiber or when the process of manufacturing the optical fiber was stopped was observed, for checking a damage on a surface of the primary coating. The damage on the surface of the primary coating can be checked by observing a lateral cross section of a facet portion of the optical fiber or a side of the optical fiber.

A result of the experiments is shown in Table 1 with each dimension of the nipple 11.

"An inlet hole" shown in Table 1 means the tubular inlet hole 14, and a value of the inlet hole represents a value of D/d, where d is the outer diameter of the primary-coated optical fiber 17.

The term "post observation" in the rightmost field of Table 1 represents a result of observation of the lateral cross section of the facet portion of the optical fiber after the series of drawing process and coating process has been completed or the process of manufacturing the optical fiber has been stopped. The optical fiber from which a damage is observed on the surface of the primary coating due to the foreign substance is indicated by "found", and the optical fiber from which a damage is not observed on the surface of the primary coating due to the foreign substance is indicated by "not found".

TABLE 1

| No. | C (mm) | A (mm) | B (mm) | Drawable length (km) | Inlet hole | L (mm) | Post observation |
|---|---|---|---|---|---|---|---|
| 1 | 8.2 | 16 | 8.0 | 300 km completed | 1.5× | 2.5 | Found |
| 2 | 9.7 | 16 | 6.6 | 150 km stopped | 1.7× | 1.0 | |
| 3 | 8.2 | 16 | 8.0 | 300 km completed | 1.7× | 1.5 | Not found |
| 4 | 2.0 | 16 | 16.0 | 300 km completed | 1.5× | 1.5 | Not found |
| 5 | 7.0 | 16 | 10.0 | 300 km completed | 1.5× | 1.5 | Not found |
| 6 | 9.0 | 16 | 7.0 | 300 km completed | 1.5× | 1.5 | Not found |
| 7 | 8.2 | 16 | 6.6 | 300 km completed | 1.5× | 1.5 | Found |
| 8 | 8.2 | 16 | 16.0 | 300 km completed | 1.5× | 1.5 | Not found |
| 9 | 8.2 | 16 | 8.0 | 300 km completed | 1.7× | 1.0 | Not found |

As shown in Table 1, the adherence of the foreign substance to the inner wall or the surrounding portion of the tubular inlet hole 14 is small when the inner diameter D of the tubular inlet hole 14 is equal to or larger than 1.5 times and equal to or smaller than 2.0 times the outer diameter d of the primary-coated optical fiber 17, the length L of the tubular inlet hole 14 is equal to or larger than 1.0 millimeter and equal to or smaller than 2.0 millimeters, the depth C of the guide hole 13 is equal to or larger than 2.0 millimeters and equal to or smaller than 9.0 millimeters, the relation B≦A is satisfied, where A is the inner diameter of the trailing edge of the guide hole 13 and B is the inner diameter of the leading edge of the guide hole 13, which is connected to the tubular inlet hole 14, and the inner diameter B is equal to or larger than 7.0 millimeters. When the above condition is satisfied, the damage caused by the adherence of the foreign substance on the surface of the primary coating is not found, and a continuous drawing of the optical fiber up to 300 kilometers can be possible.

When the depth C of the guide hole 13 is equal to or larger than 2.0 millimeters and equal to or smaller than 9.0 millimeters, the gas including the volatiles coming with the primary-coated optical fiber 17 is hard to stay in the guide hole 13. Therefore, the gas can be easily dispersed to the outside of the secondary coating device 45.

When the depth C is smaller than 2.0 millimeters, in some cases, if the resin inside the resin reservoir 18 rises up for some reason and overflows from the tubular inlet hole 14, the resin is spilled out of the secondary coating device 45, which causes a time for recovering the drawing process. On the other hand, as indicated by the sample No. 2, when the depth C is larger than 9.0 millimeters, the guide hole 13 becomes too deep, and it is considered that the gas coming with the primary-coated optical fiber 17 becomes to easily stay in the guide hole 13. As a result, the foreign substance can easily adherer to the inner wall or the surrounding portion of the tubular inlet hole 14, and the inner diameter of the tubular inlet hole 14 diminishes as time goes on. Then, it is difficult for the primary-coated optical fiber 17 to pass the tubular inlet hole 14, which results in a forced termination of the drawing and coating process.

Similarly, when the inner diameter B is smaller than 7.0 millimeters, the foreign substance can easily adhere to the inner wall or the surrounding portion of the tubular inlet hole 14, as indicated by the sample No. 2 and the sample No. 7, the drawing process cannot be continued, or the damage is found on the surface of the primary coating due to a contact of the foreign substance with the surface of the primary coating.

In addition, from the result indicated by the sample No. 1, when the length L of the tubular inlet hole 14 is larger than 2.0 millimeters, a line fluctuation of the primary-coated optical fiber 17 that moves through the tubular inlet hole 14 becomes large. In this case, even if the foreign substance adhered to the inner wall or the surrounding portion of the tubular inlet hole 14 is small, the primary-coated optical fiber 17 becomes to easily make a contact with the foreign substance, and it is considered that the damage can be easily caused on the surface. Therefore, it is preferable that the length L of the tubular inlet hole 14 should be equal to or larger than 1.0 millimeter and equal to or smaller than 2.0 millimeters.

The reason why the inner diameter D of the tubular inlet hole 14 is set to be equal to or larger than 1.5 times and equal to or smaller than 2.0 times the outer diameter d of the primary-coated optical fiber 17 that passes through the tubular inlet hole 14 is as follows.

It is because that when the value D/d is smaller than 1.5, the primary-coated optical fiber 17 can make a direct contact with the inner wall of the tubular inlet hole 14 due to the line fluctuation, or even if the foreign substance adhered to the inner wall or the surrounding portion of the tubular inlet hole 14 is not larger enough, the primary-coated optical fiber 17 becomes to easily make a contact with the foreign substance. The result is that a damage such as a scratch on the surface of the primary-coated optical fiber 17 can easily occur, which will cause a product defect.

On the other hand, if the value D/d is larger than 2.0, a pressure of the resin in the resin reservoir 18 is unbalanced, and the resin may overflow from the tubular inlet hole 14. When the resin overflows, a possibility of having air bubbles inside the coating of the optical fiber becomes high.

Therefore, it is preferable that the inner diameter D of the tubular inlet hole 14 should be equal to or larger than 1.5 times and equal to or smaller than 2.0 times the outer diameter d of the primary-coated optical fiber 17.

As described above, according to the optical-fiber coating apparatus, more particularly, the secondary coating device according to the present invention, it is possible to decrease the adherence of the foreign substance to the inner wall or the surrounding portion of the inlet hole that introduces the primary-coated optical fiber into the resin reservoir for the secondary coating.

Alternatively, a relation of B=A is still acceptable, where A is the inner diameter of the trailing edge of the guide hole 13 and B is the inner diameter of the leading edge of the guide hole 13, as indicated by the sample No. 4 in Table 1. In other words, although the vertical cross section of the guide hole 13 is an inverted trapezoid shape in FIG. 2, where the lower side is shorter than the upper side, a length of the upper side can be the same as that of the lower side, which makes a tubular shape.

However, it is preferable that B should be smaller than A, as shown in FIG. 2, because the gas staying in the guide hole 13 can be easily dispersed to the upper side of the secondary coating device 45, and can be vented to the outside of the secondary coating device 45.

Although the guide hole 13 and the tubular inlet hole 14 are integrally provided in a single nipple 11 according to the embodiment shown in FIGS. 1 and 2, for example, the guide hole 13 can be split, and can be formed with other member. However, in this case, the other member is still considered to be a part of the nipple 11.

In addition, although the R-cut connecting portion is provided between the guide hole 13 and the tubular inlet hole 14 in the nipple 11 shown in FIGS. 1 and 2, the R-cut connecting portion is a sort of optional. However, if the P-cut connecting portion is provided, for example, when manually introducing the primary-coated optical fiber 17 into the nipple 11 at the time of starting a coating process or even when the primary-coated optical fiber 17 makes a contact with the inner wall of an inlet of the tubular inlet hole 14 due to the line fluctuation of the primary-coated optical fiber 17 during the coating process, the surface of the primary coating can hardly be damaged.

As described above, according to the optical-fiber coating apparatus, more particularly, the secondary coating device according to the present invention, it is possible to decrease the adherence of the foreign substance to the inner wall or the surrounding portion of the inlet hole that introduces the primary-coated optical fiber into the resin reservoir for the secondary coating. Therefore, it is possible to provide an optical-fiber coating apparatus that can increase the speed of manufacturing the optical fiber and that can extend the length of the optical fiber to be drawn at one time.

In the optical-fiber coating apparatus according to the present invention, a guide hole that guides the primary-coated optical fiber to the tubular inlet hole is formed, being continued to a trailing edge of the tubular inlet hole and being provided coaxially with the tubular inlet hole, with an inner diameter larger than that of the tubular inlet hole. An inner diameter of the tubular inlet hole is equal to or larger than 1.5 times an outer diameter of the primary-coated optical fiber and equal to or smaller than 2.0 times the outer diameter of the primary-coated optical fiber. A length of the tubular inlet hole is equal to or larger than 1.0 millimeter and equal to or smaller than 2.0 millimeters. A depth of the guide hole is equal to or larger than 2.0 millimeters and equal to or smaller than 9.0 millimeters. A condition $B \leq A$ is satisfied with B equal to or larger than 7.0 millimeters, where A is an inner diameter of a leading edge of the guide hole that is continued to the trailing edge of the tubular inlet hole, and B is an inner diameter of a trailing edge of the guide hole.

As a result, a gas coming on a surface of the primary coating is easily dispersed to outside of the secondary coating device without staying in a guide hole for the primary-coated optical fiber in the secondary coating device.

Therefore, because the volatiles included in the gas are dispersed with the gas to the outside of the secondary coating device, the volatiles are hard to be concentrated and adhere to the inner wall or the surrounding portion of the tubular inlet hole, and thus the process of manufacturing the optical fiber can be speeded up and the length of the optical fiber to be drawn at one time can be extended with ease.

As describe above, according to an aspect of the present invention, an adherence of the foreign substance to the inner wall or the surrounding portion of the inlet hole for introducing the primary-coated optical fiber into the resin reservoir for the secondary coating can be further reduced, and as a result, it is possible provide an optical-fiber coating apparatus that can make a speed of manufacturing the optical fiber faster and extend the length of the optical fiber to be drawn at one time.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical-fiber coating apparatus comprising:
   a primary coating device that forms a primary coating on a surface of a glass optical fiber; and
   a secondary coating device that forms a secondary coating on a surface of a primary-coated optical fiber on which the primary coating is formed, the secondary coating device including
   a tubular inlet hole that introduces the primary-coated optical fiber into a resin reservoir provided in the secondary coating device,
   a guide hole that guides the primary-coated optical fiber to the tubular inlet hole, the guide hole being continued to a trailing edge of the tubular inlet hole and being provided coaxially with the tubular inlet hole, wherein
   an inner diameter of the guide hole is larger than an inner diameter of the tubular inlet hole,
   the inner diameter of the tubular inlet hole is equal to or larger than 1.5 times an outer diameter of the primary-coated optical fiber and equal to or smaller than 2.0 times the outer diameter of the primary-coated optical fiber,
   a length of the tubular inlet hole is equal to or larger than 1.0 millimeter and equal to or smaller than 2.0 millimeters,
   a depth of the guide hole is equal to or larger than 2.0 millimeters and equal to or smaller than 9.0 millimeters, and
   a following condition is satisfied $B \leq A$ with B equal to or larger than 7.0 millimeters, where A is an inner diameter of a leading edge of the guide hole that is continued to the trailing edge of the tubular inlet hole, and B is an inner diameter of a trailing edge of the guide hole.

* * * * *